(12) United States Patent
    Xing et al.

(10) Patent No.: US 11,102,767 B2
(45) Date of Patent: Aug. 24, 2021

(54) UPLINK DATA RETRANSMISSION METHOD AND TERMINAL

(71) Applicant: CHINA ACADEMY OF TELECOMMUNICATIONS TECHNOLOGY, Beijing (CN)

(72) Inventors: Yanping Xing, Beijing (CN); Fang-Chen Cheng, Beijing (CN); Ekpenyong Tony, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/476,122

(22) PCT Filed: Feb. 2, 2018

(86) PCT No.: PCT/CN2018/075136
§ 371 (c)(1),
(2) Date: Jul. 5, 2019

(87) PCT Pub. No.: WO2018/127214
PCT Pub. Date: Jul. 12, 2018

(65) Prior Publication Data
US 2019/0357203 A1   Nov. 21, 2019

(30) Foreign Application Priority Data
Jan. 6, 2017 (CN) .......................... 201710011300.3

(51) Int. Cl.
*H04W 72/04* (2009.01)
*H04L 1/18* (2006.01)
*H04W 72/08* (2009.01)

(52) U.S. Cl.
CPC ....... *H04W 72/0413* (2013.01); *H04L 1/1803* (2013.01); *H04L 1/1812* (2013.01);
(Continued)

(58) Field of Classification Search
CPC ........... H04W 72/0413; H04W 74/004; H04W 72/0446; H04W 72/085; H04W 52/00;
(Continued)

(56) References Cited

U.S. PATENT DOCUMENTS 5,541,924 A * 7/1996 Tran ..................... H04B 7/2643
                                                370/346
2005/0276266 A1* 12/2005 Terry .................... H04L 1/1848
                                                370/394
(Continued)

FOREIGN PATENT DOCUMENTS

CN    102255709 A    11/2011
CN    103391173 A    11/2013
(Continued)

OTHER PUBLICATIONS

3GPP TSG-RAN WG1#87, 'Discussion on HARQ support for URLLC', R1-1612246, Reno, NV, USA Nov. 14-18, 2016.
(Continued)

*Primary Examiner* — Wutchung Chu
(74) *Attorney, Agent, or Firm* — Kilpatrick Townsend & Stockton, LLP

(57) ABSTRACT

The present application discloses an uplink data retransmission method and terminal. The method comprises: a terminal determining whether to spontaneously retransmit first uplink data; and if the terminal determines to spontaneously retransmit the first uplink data, the terminal retransmitting the first uplink data on a physical resource that is pre-configured on a network side. The application adopts the above technical solution to resolve the technical problem in which, for a URLLC service, if a retransmission mechanism is based on a conventional HARQ mechanism, a certain time interval is required between two adjacent transmissions of uplink data, which may result in retransmission being unsupported for a certain time delay requirement and con-
(Continued)

S101
The terminal decides whether to retransmit first uplink data on its own initiative S102
The terminal retransmits the first uplink data over a physical resource preconfigured by a network side upon deciding to retransmit the first uplink data on its own initiative figuration, and as a result a reliability requirement for the URLLC service cannot be met.

6 Claims, 3 Drawing Sheets

(52) U.S. Cl.
CPC ....... *H04L 1/1893* (2013.01); *H04W 72/0446* (2013.01); *H04W 72/085* (2013.01)

(58) Field of Classification Search
CPC ... H04L 1/1803; H04L 1/1806; H04L 1/1812; H04L 1/1893; H04L 1/1896; H04L 5/0055; H04L 1/1816; H04L 1/18; H04L 1/189
See application file for complete search history.

(56) References Cited

U.S. PATENT DOCUMENTS

| | | | | |
|---|---|---|---|---|
| 2008/0081651 | A1* | 4/2008 | Kuroda | H04L 1/1893 455/509 |
| 2010/0142470 | A1* | 6/2010 | Park | H04L 1/1854 370/329 |
| 2011/0107170 | A1* | 5/2011 | Park | H04L 1/1854 714/749 |
| 2014/0254552 | A1* | 9/2014 | Hayes | H04W 36/16 370/331 |
| 2015/0181571 | A1* | 6/2015 | Park | H04W 76/28 370/252 |
| 2016/0219545 | A1* | 7/2016 | Zhang | H04L 5/14 |
| 2016/0219627 | A1* | 7/2016 | Au | H04W 74/0841 |
| 2018/0083753 | A1* | 3/2018 | Nagaraja | H04L 5/0048 |
| 2018/0278373 | A1* | 9/2018 | Wang | H04L 1/1812 |
| 2018/0294940 | A1* | 10/2018 | Lee | H04W 72/14 |

FOREIGN PATENT DOCUMENTS

| | | |
|---|---|---|
| CN | 106063309 A | 10/2016 |
| CN | 106301700 A | 1/2017 |
| WO | 2016002436 A1 | 1/2016 |

OTHER PUBLICATIONS

3GPP TSG-RAN WG1#87, 'Early Hybrid ARQ Feedback for the 5G New Radio', R1-1612249, Reno, NV, USA, Nov. 14-18, 2016.
3GPP TSG RAN WG2 Meeting #94, 'Discuss on the NR user plane protocol design', R2-163737, Nanjing, China, May 23-27, 2016.

* cited by examiner

UPLINK DATA RETRANSMISSION METHOD AND TERMINAL

This application is a National Stage of International Application No. PCT/CN2018/075136, filed Feb. 2, 2018, which claims priority to Chinese Patent Application No. 201710011300.3, filed Jan. 6, 2017, both of which are hereby incorporated by reference in their entireties.

FIELD

The present application relates to the field of communications, and particularly to a method for retransmitting uplink data, and a terminal.

BACKGROUND

In the study of Next-generation Radio (NR), it has been ascertained at present that a grant-free uplink transmission mechanism, for which no grant is required, will be supported for Ultra-Reliable and Low-Latency Communication (URLLC). In the grant-free uplink transmission mechanism, a dynamic and explicit scheduling grant from a base station is not required for uplink transmission from a terminal, but the terminal transmits uplink data directly over a selected source.

A short delay and high reliability is required for a URLLC service, and a delay via an air interface is required to be approximately 1 ms. In order to provide the required short delay and high reliability, the number of times that data are retransmitted shall be increased as many as possible while providing the required delay, to thereby improve the reliability.

In an uplink transmission mechanism in the existing Long Term Evolution (LTE) system, uplink data are retransmitted in a Hybrid Automatic Repeat reQuest (HARQ) mechanism. The terminal decides whether to retransmit the data, based upon feedback of the network side. Two feedback schemes are supported in the LTE system: in one feedback scheme, HARQ-ACK, i.e., Acknowledgement (ACK) or Non-Acknowledgment (NACK), is fed back in a Physical Hybrid ARQ Indicator Channel (PHICH) so that the terminal does not retransmit the data upon reception of ACK, and retransmits the data according to a fixed timing relationship upon reception of NACK; and in the other feedback scheme, feedback is made in a New Data Indication (NDI) field in Downlink Control Information (DCI) so that the UE transmits new data instead of retransmitting the data when the NDI field indicates the new data to be transmitted, and retransmits the data when the NDI field indicates the old data to be transmitted.

A base station needs to decode the uplink data of the terminal, and to generate a feedback message, upon reception of the uplink data; and the terminal needs to decode the feedback message of the base station, and to generate a data packet to be retransmitted, or a new data packet to be transmitted, upon reception of the feedback message, that is, it takes some period of time for the base station and the terminal respectively to process them.

For the URLLC service, if the legacy HARQ mechanism is still applied to the retransmission mechanism, there will be some interval of time between two adjacent transmission instances of the uplink data so that retransmission may not be supported given a specific time-delay requirement and configuration, thus failing to provide the required reliability of the URLLC service.

Apparently there is such a technical problem in the related art that for the URLLC service, if the legacy HARQ mechanism is still applied to the retransmission mechanism, there will be some interval of time between two adjacent transmission instances of the uplink data, so that retransmission may not be supported given a specific time-delay requirement and configuration, thus failing to provide the required reliability of the URLLC service.

SUMMARY

Embodiments of the application provide a method for retransmitting uplink data, and a terminal, where a terminal decides whether to retransmit first uplink data on its own initiative, and when the terminal decides to retransmit the first uplink data on its own initiative, the terminal will retransmit the first uplink data on its own initiative over a physical resource preconfigured by the network side. With the above technical solution, such a technical problem can be addressed that for an URLLC service, if the legacy HARQ mechanism is still applied to a retransmission mechanism, there will be some interval of time between two adjacent transmission instances of uplink data so that retransmission may not be supported given a specific time-delay requirement and configuration, thus failing to provide the required reliability of the URLLC service.

In a first aspect, an embodiment of the application provides a method for retransmitting uplink data, applicable to a terminal, the method including: deciding, by the terminal, whether to retransmit first uplink data on its own initiative; and retransmitting, by the terminal, the first uplink data over a physical resource preconfigured by a network side upon deciding to retransmit the first uplink data on its own initiative.

Optionally deciding, by the terminal, whether to retransmit the first uplink data on its own initiative includes: deciding, by the terminal, whether to retransmit the first uplink data on its own initiative, based upon a received notification message of the network side about whether to enable an initiative retransmission mechanism.

Optionally retransmitting, by the terminal, the first uplink data over the physical resource preconfigured by the network side includes: after the terminal transmits the first uplink data to the network side, and before the terminal obtains a feedback message of the network side for the first uplink data, retransmitting, by the terminal, the first uplink data over the physical resource preconfigured by the network side.

Optionally retransmitting, by the terminal, the first uplink data over the physical resource preconfigured by the network side includes: obtaining, by the terminal, the number of transmission times that the terminal retransmits the first uplink data; and stopping, by the terminal, the first uplink data from being retransmitted, when the number of transmission times reaches a maximum number of transmission times corresponding to the first uplink data.

Optionally deciding, by the terminal, whether to retransmit the first uplink data on its own initiative includes: detecting, by the terminal, whether terminal receives a received feedback message of the network side for the first uplink data before a specific point of time, and obtaining a first detection result; and deciding whether to retransmit the first uplink data on its own initiative, based upon the first detection result; where when the first detection result is YES, deciding, by the terminal, not to retransmit the first uplink data on its own initiative, and when the first detection result is NO, deciding, by the terminal, to retransmit the first uplink data on its own initiative.

Optionally the specific point of time is a point of time corresponding to a preset length of time before the physical resource preconfigured by the network side is available and after the first uplink data are transmitted.

Optionally the preset length of time is a preset value, or the preset length of time is determined and notified by the network side to the terminal, or the preset length of time is determined and notified by the terminal to the network side.

Optionally detecting, by the terminal, a received feedback message of the network side for the first uplink data before the specific point of time, and obtaining the first detection result includes: after the terminal transmits the first uplink data to the network side, detecting, by the terminal, a received feedback message of the network side for the first uplink data before the specific point of time, by listening to the feedback message of the network side for the first uplink data, and obtaining the first detection result.

Optionally detecting, by the terminal, a received feedback message of the network side for the first uplink data before the specific point of time, by listening to the feedback message of the network side for the first uplink data, and obtaining the first detection result includes: determining, by the terminal, an instance of time when the network side transmits the feedback message for the first uplink data; and detecting, by the terminal, whether the terminal receives the received feedback message of the network side for the first uplink data before the specific point of time based upon the instance of time when the feedback message is transmitted, and obtaining the first detection result; where when the terminal determines based upon the instance of time when the feedback message is transmitted, that the feedback message of the network side for the first uplink data is not received before the specific point of time, the terminal stops listening to the feedback message of the network side for the first uplink data.

In a second aspect, an embodiment of the application provides a terminal including: a first deciding module configured to decide whether to retransmit first uplink data on its own initiative; and an initiative retransmitting module configured to retransmit the first uplink data over a physical resource preconfigured by a network side when the terminal decides to retransmit the first uplink data on its own initiative.

Optionally the first deciding module is configured: to decide whether to retransmit the first uplink data on its own initiative, based upon a received notification message of the network side about whether to enable an initiative retransmission mechanism.

Optionally the initiative retransmitting module is configured: after the terminal transmits the first uplink data to the network side, and before the terminal obtains a feedback message of the network side for the first uplink data, to retransmit the first uplink data over the physical resource preconfigured by the network side.

Optionally the initiative retransmitting module includes: a unit for obtaining the number of transmission times, configured to obtain the number of transmission times that the terminal retransmits the first uplink data; and a retransmitting unit configured to stop the first uplink data from being retransmitted, when the number of transmission times reaches a maximum number of transmission times corresponding to the first uplink data.

Optionally the first deciding module includes: a detecting unit configured to detect whether the terminal receives a received feedback message of the network side for the first uplink data before a specific point of time, and to obtain a first detection result; and a deciding unit configured to decide whether to retransmit the first uplink data on its own initiative, based upon the first detection result; where when the first detection result is YES, the deciding unit decides not to retransmit the first uplink data on its own initiative, and when the first detection result is NO, the deciding unit decides to retransmit the first uplink data on its own initiative.

Optionally the specific point of time is a point of time corresponding to a preset length of time before the physical resource preconfigured by the network side is available and after the first uplink data are transmitted.

Optionally the preset length of time is a preset value, or the preset length of time is determined and notified by the network side to the terminal, or the preset length of time is determined and notified by the terminal to the network side.

Optionally the detecting unit is configured: after the terminal transmits the first uplink data to the network side, to detect the received feedback message of the network side for the first uplink data before the specific point of time, by listening to the feedback message of the network side for the first uplink data, and to obtain the first detection result.

Optionally the detecting unit is configured: to determine an instance of time when the network side transmits the feedback message for the first uplink data; and to detect whether the terminal receives the received feedback message of the network side for the first uplink data before the specific point of time based upon the instance of time when the feedback message is transmitted, and to obtain the first detection result; where when the terminal determines based upon the instance of time when the feedback message is transmitted, that the feedback message of the network side for the first uplink data is not received before the specific point of time, to stop listening to the feedback message of the network side for the first uplink data.

In a third aspect, an embodiment of the application provides a terminal including: a processor, a memory, and a transceiver, where: the processor is configured to read and execute program in the memory: to decide whether to retransmit first uplink data on its own initiative; and to retransmit the first uplink data over a physical resource preconfigured by a network side when the terminal decides to retransmit the first uplink data on its own initiative.

Optionally the processor is configured: to decide whether to retransmit the first uplink data on its own initiative, based upon a received notification message of the network side about whether to enable an initiative retransmission mechanism.

Optionally the processor is configured: after the terminal transmits the first uplink data to the network side, and before the terminal obtains a feedback message of the network side for the first uplink data, to retransmit the first uplink data over the physical resource preconfigured by the network side.

Optionally the processor is configured: to obtain the number of transmission times that the terminal retransmits the first uplink data; and to stop the first uplink data from being retransmitted, when the number of transmission time reaches the maximum number of transmission times corresponding to the first uplink data.

Optionally the processor is configured: to detect whether the terminal receives a received feedback message of the network side for the first uplink data before a specific point of time, and to obtain a first detection result; and to decide whether to retransmit the first uplink data on its own initiative, based upon the first detection result; where when the first detection result is YES, the processor decides not to retransmit the first uplink data on its own initiative, and when the first detection result is NO, the processor decides to retransmit the first uplink data on its own initiative.

Optionally the specific point of time is a point of time corresponding to a preset length of time before the physical resource preconfigured by the network side is available after the first uplink data are transmitted.

Optionally the preset length of time is a preset value, or the preset length of time is determined and notified by the network side to the terminal, or the preset length of time is determined and notified by the terminal to the network side.

Optionally the processor is configured: after the terminal transmits the first uplink data to the network side, to detect a received feedback message of the network side for the first uplink data before the specific point of time, by listening to the feedback message of the network side for the first uplink data, and to obtain the first detection result.

Optionally the processor is configured: to determine an instance of time when the network side transmits the feedback message for the first uplink data; and to detect whether the terminal receives the received feedback message of the network side for the first uplink data before a specific point of time based upon the instance of time when the feedback message is transmitted, and to obtain the first detection result; where when the terminal determines based upon the instance of time when the feedback message is transmitted, that the feedback message of the network side for the first uplink data can not be received before the specific point of time, to stop listening to the feedback message of the network side for the first uplink data.

In a fourth aspect, an embodiment of the application provides a non-transitory readable storage medium including program codes configured, upon being executed on a computing device, to cause the computing device to perform the method according to any one of the solutions in the first aspect above.

One or more technical solutions according to the embodiments of the application has or have the following technical effects: Firstly a terminal decides whether to retransmit first uplink data on its own initiative, and then if so, then the terminal will retransmit the first uplink data on its own initiative over a physical resource preconfigured by the network side. With this technical solution, such a technical problem can be addressed that for an URLLC service, if the legacy HARQ mechanism is still applied to a retransmission mechanism, then there will be some interval of time between two adjacent transmission instances of uplink data so that retransmission may not be supported given a specific time-delay requirement and configuration, thus failing to provide the required reliability of the URLLC service. In this way, retransmission of the uplink data by the terminal on its own initiative can be supported to thereby shorten the interval of time between two adjacent transmission instances of the uplink data, improve a retransmission probability, increase the number of times that the data are retransmitted, and improve the reliability of data transmission.

DETAILED DESCRIPTION OF THE EMBODIMENTS

Figure 1:
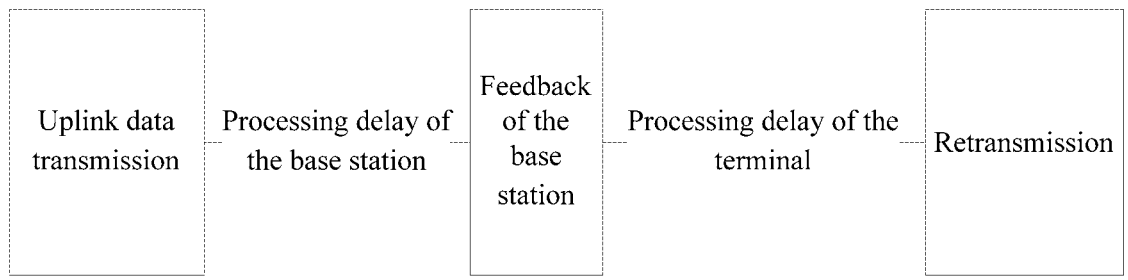
FIG. 1 is a schematic flow chart of a method for retransmitting uplink data in the related art.

FIG. 1 illustrates a schematic flow chart of a method for retransmitting uplink data in the related art, and a repeated description thereof will be omitted here.

In order to address the technical problem above, a general idea of the technical solutions according to the embodiments of the application is as follows: a terminal decides whether to retransmit first uplink data on its own initiative, and when the terminal decides to retransmit the first uplink data on its own initiative, the terminal will retransmit the first uplink data on its own initiative over a physical resource preconfigured by the network side. The terminal decides whether to retransmit the first uplink data on its own initiative, based upon a received notification message of the network side about whether to enable an initiative retransmission mechanism; or the terminal detects a received feedback message of the network side for the first uplink data before a specific point of time, obtains a first detection result, and decides whether to retransmit the first uplink data on its own initiative, based upon the first detection result.

With the technical solution above, such a technical problem in the related art can be addressed in effect that for an URLLC service, if the legacy HARQ mechanism is still applied to a retransmission mechanism, then there will be some interval of time between two adjacent transmission instances of uplink data so that retransmission may not be supported given a specific time-delay requirement and configuration, thus failing to provide the required reliability of the URLLC service. In this way, retransmission of the uplink data by the terminal on its own initiative can be supported to thereby shorten the interval of time between two adjacent transmission instances of the uplink data, improve a retransmission probability, increase the number of times that the data are retransmitted, and improve the reliability of data transmission.

In order to better understand the technical solution above, the technical solution above can be described below in details with reference to the drawings and particular embodiments thereof. In the embodiments of the application, the network side preconfigures a physical resource for grant-free uplink transmission. The physical resource can be specific to a mobile terminal, or can be shared among mobile terminals, although the embodiment of the application will not be limited thereto.

First Embodiment

Figure 2:
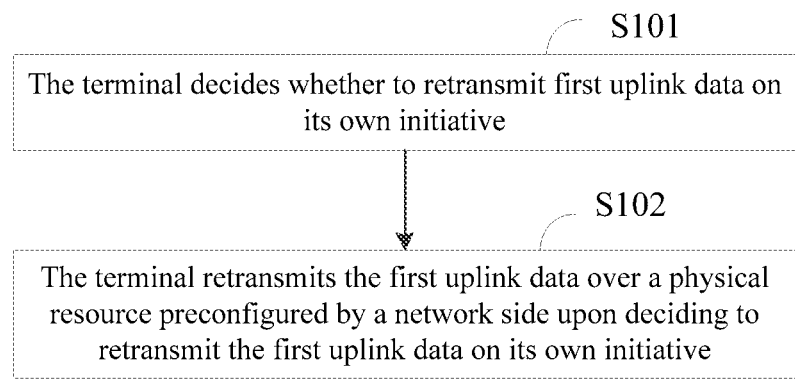
FIG. 2 is a schematic flow chart of a method for retransmitting uplink data according to an embodiment of the application.

Referring to FIG. 2, a first embodiment of the application provides a method for retransmitting uplink data, applicable to a terminal, where the method includes the following operations.

In the operation S101, the terminal decides whether to retransmit first uplink data on its own initiative.

In the operation S102, the terminal retransmits the first uplink data over a physical resource preconfigured by the network side upon deciding to retransmit the first uplink data on its own initiative.

In a particular implementation of the embodiment of the application, in a first implementation of the operation S101: the terminal decides whether to retransmit the first uplink data on its own initiative, based upon a received notification message of the network side about whether to enable an initiative retransmission mechanism.

Stated otherwise, if the notification message received by the terminal indicates that the initiative retransmission mechanism is to be enabled, the terminal will decide to retransmit the first uplink data on its own initiative; or if the notification message received by the terminal indicates that the initiative retransmission mechanism is not to be enabled, the terminal will not retransmit the first uplink data on its own initiative.

Figure 3:
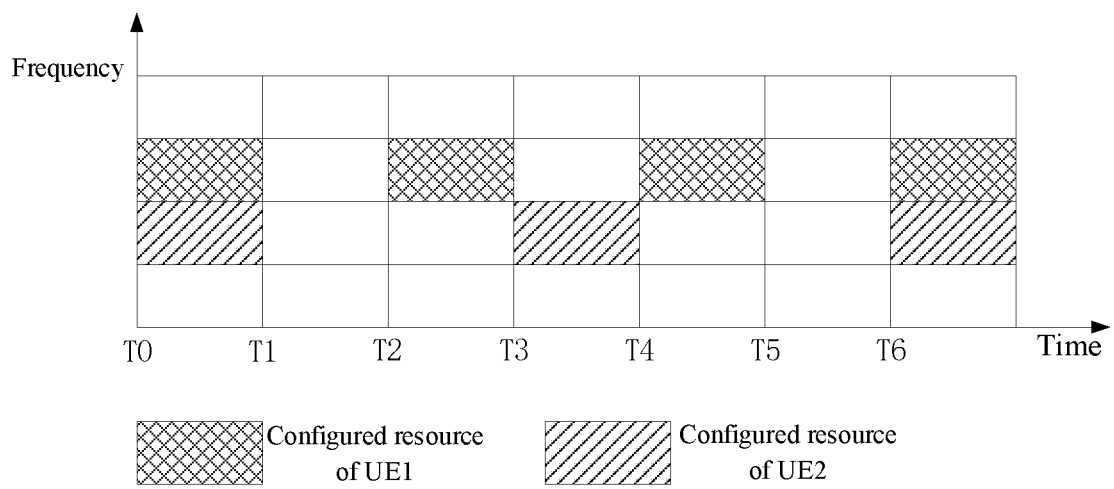
FIG. 3 is a first schematic diagram of periodical physical resources configured by the network side according to an embodiment of the application.

Particularly referring to FIG. 3, for example, the network side preconfigures a physical resource for grant-free uplink transmission. The physical resource can be specific to a terminal, or can be shared among terminals. Here the network side preconfigures a physical resource specific to a terminal, for example, the network side preconfigures time-frequency resources for grant-free uplink transmission as illustrated in FIG. 3 respectively for a first terminal UE1 and a second terminal UE2.

In the first implementation, the network side notifies the terminal of whether to enable the initiative retransmission mechanism. This can be notified semi-statically via higher-layer signaling, or can be notified dynamically via physical-layer signaling, where the higher-layer signaling can be at a cell level, a terminal-group level, or a terminal level. In the embodiment of the application, the high-layer signaling is at a terminal level, for example, the network side configures the terminal via higher-layer dedicated signaling to or not to enable the initiative retransmission mechanism. In some embodiments, the network side can configure the UE1 to enable the initiative retransmission mechanism, and configure the UE2 not to enable the initiative retransmission mechanism, so that the UE1 retransmits its first uplink data on its own initiative upon reception of a notification message transmitted by the network side to enable the initiative retransmission mechanism, and the UE2 does not retransmit its first uplink data on its own initiative upon reception of a notification message transmitted by the network side not to enable the initiative retransmission mechanism.

Furthermore in a particular implementation, the mobile terminal decides to retransmit the first uplink data on its own initiative as follows: after the terminal transmits the first uplink data to the network side, and before the terminal obtains a feedback message of the network side for the first uplink data, the terminal retransmits the first uplink data over the physical resource preconfigured by the network side.

Furthermore the terminal retransmits the first uplink data over the physical resource preconfigured by the network side in the operation S102 as follows in some embodiments: the terminal obtains the number of times that the terminal retransmits the first uplink data; and when the number of times reaches the maximum number of times corresponding to the first uplink data, the terminal stops the first uplink data from being retransmitted, or when the number of times does not reach the maximum number of times corresponding to the first uplink data, the terminal continues with retransmitting the first uplink data.

With reference to FIG. 3, for example, the first uplink data of the UE1 are ready to be transmitted at an instance of time T1, then the UE1 will initially start to transmit the first uplink data over a physical resource preconfigured by the network side for the UE1, at an instance of time T2. As described above, since the network side configures the UE to enable the initiative retransmission mechanism, the UE1 starts to retransmit the first uplink data over a physical resource preconfigured by the network side for the UE1, at an instance of time T4 on its own initiative. Before the maximum number of times is reached, the UE1 continues with retransmitting the first uplink data on its own initiative over a physical resource preconfigured by the network side for the UE1. For example, if the UE1 determines the maximum number of times that the first uplink data are transmitted, as 3, then the UE1 will further start to retransmit the first uplink data once more over a physical resource preconfigured by the network side for the UE1, at an instance of time T6.

Optionally in order to save power, in the embodiments of the application, after the first uplink data are transmitted, or after the first uplink data are retransmitted, the terminal does not listen to any feedback message transmitted by the network side to the terminal based upon the first uplink data.

Furthermore with reference to FIG. 3, for example, the uplink data of the UE2 arrives at the instance of time T1, so the UE2 starts to initially transmit the first uplink data over a physical resource preconfigured by the network side for the UE2, at an instance of time T3. As described above, since the network side configures the UE2 not to enable the initiative retransmission mechanism, the UE2 listens to a feedback message of the network side for the first uplink data after transmitting the first uplink data, where the feedback message can be an HARQ-ACK message indicating whether the first uplink data are received correctly, or the feedback message is downlink control information including a new data indicator indicating whether a resource is to be subsequently allocated for transmitting new data or retransmission. Upon reception of the feedback message of the network side, the UE2 retransmits the first uplink data upon determining that the feedback message is NACK fed back by the network side, or the network side indicates retransmission in the DCI. Particularly when the network side feeds back only NACK, the UE2 retransmits the first uplink data over a physical resource preconfigured by the network side for the UE2; and when the network side indicates retransmission in the DCI, and indicates a retransmission resource, the UE2 retransmits the first uplink data over the retransmission resource allocated by the network side.

In a particular implementation of the embodiment of the application, in a second implementation of the operation S101: the UE detects a received feedback message of the network side for the first uplink data before a specific point of time, and obtains a first detection result; and the terminal decides whether to retransmit the first uplink data on its own initiative, based upon the first detection result; where when the first detection result is YES, the terminal decides not to retransmit the first uplink data on its own initiative, and when the first detection result is NO, the terminal decides to retransmit the first uplink data on its own initiative.

Furthermore in the embodiments of the application, the specific point of time is a point of time corresponding to a preset length of time before the physical resource preconfigured by the network side is available and after the first uplink data are transmitted.

Furthermore in the embodiments of the application, the preset length of time can be represented as X, which can be obtained by those skilled in the art in different manners, and for example, X is a preset value, or X is determined and notified by the network side to the terminal, or X is determined and notified by the terminal to the network side.

In a particular implementation, the terminal can detect a received feedback message of the network side for the first uplink data before a specific point of time, and obtain the first detection result as follows: after the terminal transmits the first uplink data to the network side, the terminal detects a received feedback message of the network side for the first uplink data before a specific point of time, by listening to the feedback message of the network side for the first uplink data, and obtains the first detection result.

Furthermore in the embodiment of the application, the terminal can detect a received feedback message of the network side for the first uplink data before a specific point of time, by listening to the feedback message of the network side for the first uplink data, and obtain the first detection result as follows: the terminal determines an instance of time when the network side transmits the feedback message for the first uplink data; and the terminal detects a received feedback message of the network side for the first uplink data before a specific point of time based upon the instance of time when the feedback message is transmitted, and obtain the first detection result; where when the terminal determines based upon the instance of time when the feedback message is transmitted, that the feedback message of the network side for the first uplink data can not be received before the specific point of time, the terminal stops listening to the feedback message of the network side for the first uplink data.

Figure 4:
FIG. 4 is a second schematic diagram of periodical physical resources configured by the network side according to an embodiment of the application.

Referring to FIG. 4, particularly the network side configures periodical physical resources as illustrated in FIG. 4. The terminal starts to transmit the first uplink data over one of the physical resources preconfigured by the network side, at the instance of time T0; and in the embodiment of the application, after the first uplink data are transmitted, the terminal detects a received feedback message of the network side for the first uplink data before a specific point of time (i.e., the instance of time T2), obtains a first detection result, and decides whether to retransmit the first uplink data on its own initiative, based upon the first detection result.

Furthermore in the second implementation, the terminal detects a received feedback message of the network side for the first uplink data before the instance of time T2, and obtains the first detection result in the operation S102 in the following two schemes.

In a first scheme, the terminal listens to a feedback message all the time. The terminal detects a received feedback message of the network side for the first uplink data before the instance of time T2 by listening to the feedback message of the network side for the first uplink data all the time after initially transmitting the first uplink data at the instance of time T1.

In a second scheme, the terminal predetermines whether a feedback message can be received before a specific point of time. The terminal predetermines according to a configuration or an indicator of the network side whether a feedback message of the network side for the first uplink data can be received at the instance of time T2 corresponding to a period of time X after a physical resource preconfigured by the network side is available.

Furthermore in the embodiment of the application, when the first detection result is obtained by predetermining whether a feedback message can be received before a specific point of time, and the first detection result is NO, which indicates that the terminal can not receive a feedback message of the network side for the first uplink data before the instance of time T2, the terminal will not detect any received feedback message of the network side for the first uplink data, by listening or in another way. Since the first detection result is NO, the terminal retransmits the first uplink data at the instance of time T3. Particularly T0 in FIG. 4 is an initial instance of time when the terminal starts to initially transmit the first uplink data, T1 is the first instance of time after the terminal transmits the first uplink data, T2 is the second instance of time the X μs before the instance of time T3, where X can be specified in a protocol, or configured and then transmitted by the network side to the terminal, or determined by the terminal according to a capability thereof, and notified to the network side. In one embodiment, X shall be determined taking into account a period of time for the terminal to receive the feedback of the base station, and to prepare for the first uplink data.

Alike the terminal obtains the number of times that the data are retransmitted, while retransmitting the first uplink data at the instance of time T3, and continues with retransmitting the first uplink data on its own initiative over a physical resource preconfigured by the network side for the terminal, until the number of times that the data are retransmitted reaches the maximum number of times.

Furthermore when the first detection result is YES, which indicates that it is possible for the terminal to receive a feedback message of the network side for the first uplink data before the instance of time T2, the terminal decides whether to initiate retransmission, based upon the feedback message of the network side for the first uplink data. The terminal retransmits the first uplink data upon determining that the feedback message is NACK fed back by the network side, or the network side indicates retransmission in the DCI. Particularly when the network side feeds back only NACK, the terminal retransmits the first uplink data over a physical resource subsequently preconfigured by the network side for the terminal; and when the network side indicates retransmission in the DCI, and indicates a retransmission resource, the terminal retransmits the first uplink data over the retransmission resource allocated by the network side.

Figure 5:
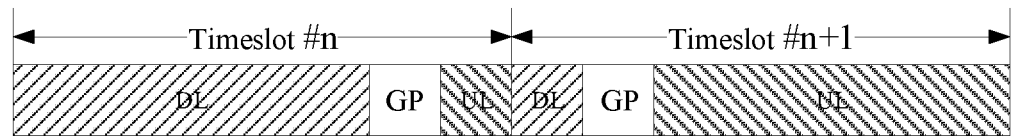
FIG. 5 is a third schematic diagram of an uplink-downlink configuration scheme configured by the network side according to an embodiment of the application.
Figure 6:
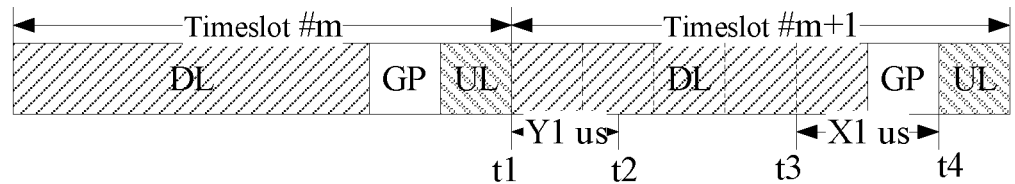
FIG. 6 is a fourth schematic diagram of an uplink-downlink configuration scheme configured by the network side according to an embodiment of the application.

The following description will be given with reference to FIG. 5 and FIG. 6, and taking NR TDD as an example, a downlink sub-carrier spacing is 15 kHz, for example, the length of each timeslot is 0.5 ms, where each timeslot includes downlink symbols, GPs, and uplink symbols. The numbers of downlink symbols, GPs, and uplink symbols in each timeslot can vary.

For example, the network side preconfigures the terminal with the last symbol for grant-free uplink transmission in each timeslot. Furthermore FIG. 5 illustrates an uplink-downlink allocation proportion in two timeslots of 1 ms, that is, the timeslot #n includes only one uplink symbol which is the very last in the timeslot, and the timeslot #n+1 includes only one downlink symbol which is the very first in the timeslot.

In this way, the terminal initially transmits the first uplink data in the uplink symbol in the timeslot #n, and then determines according to the uplink-downlink proportion in the timeslot #n+1 that the network side can not make feedback for the first uplink data transmitted in the timeslot #n, and transmit a feedback message to the terminal, in the timeslot #n+1 because it takes such a period of time for the network side to process the first uplink data packet of the terminal upon reception thereof that the network side can not make feedback and transmit a feedback message to the terminal in the downlink symbol in the timeslot #n+1 that immediately follows. Accordingly the terminal retransmits the first uplink data transmitted in the timeslot #n, in the last uplink symbol in the timeslot #n+1 on its own initiative.

Optionally in order to save power, the terminal does not listen to a feedback message for the first uplink data packet transmitted in the timeslot #n, on the downlink symbol of the timeslot #n+1.

Still taking NR TDD as an example, a downlink subcarrier spacing is 15 kHz, for example, so the length of each timeslot is 0.5 ms. Furthermore FIG. 6 illustrates an uplink-downlink allocation proportion in two timeslots of 1 ms, where both the timeslot #m and the timeslot #m+1 include only one uplink symbol which is the very last in the respective timeslots.

Furthermore, for example, the network side still preconfigures the terminal with the last symbol for grant-free uplink transmission in each timeslot so that the terminal transmits the first uplink data in the uplink symbol in the timeslot #m, and determines whether a feedback message of the network side for the first uplink data transmitted in the timeslot #m can be received in the period of time X before the uplink symbol in the timeslot #m+1, according to a control channel listening position in the time domain in the timeslot #m+1.

In the embodiment of the application, for example, the terminal can listen to a downlink control channel only in the first two downlink symbols in the timeslot #m+1. Dependent upon a processing delay Y of the base station, where Y is the shortest interval of time between reception of the first uplink data of the terminal, and feedback the feedback message for the first uplink data by the base station, the terminal predetermines that the base station can only feed back the feedback message for the first uplink data, at earliest in the third downlink symbol in the timeslot #m+1, so the terminal can not receive the feedback message for the first uplink data transmitted in the timeslot #m, in the period of time X before the uplink symbol. Accordingly the terminal retransmits the first uplink data in the uplink symbol in the timeslot #m+1 on its own initiative.

In this embodiment, the network side configures the terminal to or not to enable the initiative retransmission mechanism for the first uplink data, and when the network side configures the terminal to enable the initiative retransmission mechanism, the terminal can retransmit the uplink data on its own initiative over the physical resource configured by the network side to thereby address the technical problem in the prior art that for an URLLC service, if the legacy HARQ mechanism is still applied to a retransmission mechanism, then there will be some interval of time between two adjacent transmission instances of uplink data so that retransmission may not be supported given a specific time-delay requirement and configuration, thus failing to provide the required reliability of the URLLC service. In this way, retransmission of the uplink data by the mobile terminal on its own initiative can be supported to thereby shorten the interval of time between two adjacent transmission instances of the uplink data, improve a retransmission probability, increase the number of times that the data are retransmitted, and improve the reliability of data transmission.

Second Embodiment

Figure 7:
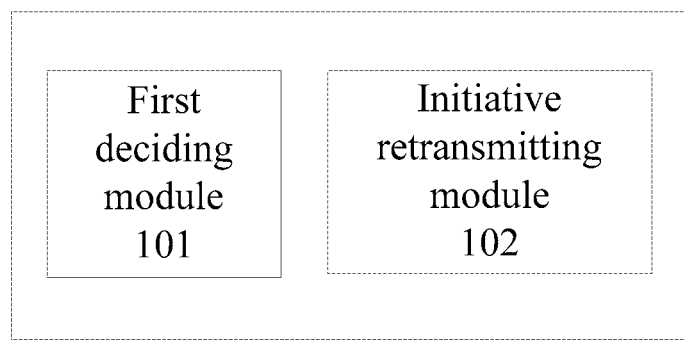
FIG. 7 is a schematic structural diagram of modules in a terminal according to an embodiment of the application.

Referring to FIG. 7, an embodiment of the application provides a terminal including: a first deciding module 101 is configured to decide whether to retransmit first uplink data on its own initiative; and an initiative retransmitting module 102 is configured to retransmit the first uplink data over a physical resource preconfigured by the network side when the terminal decides to retransmit the first uplink data on its own initiative.

Particularly for example, the first deciding module 101 decides whether to retransmit the first uplink data on its own initiative, and the initiative retransmitting module 102 retransmits the first uplink data over the physical resource preconfigured by the network side when the terminal decides to retransmit the first uplink data on its own initiative.

Furthermore in a particular implementation, the first deciding module is configured: to decide whether to retransmit the first uplink data on its own initiative, based upon a received notification message of the network side about whether to enable an initiative retransmission mechanism.

Furthermore in a particular implementation, the initiative retransmitting module is further configured: after the terminal transmits the first uplink data to the network side, and before the terminal obtains a feedback message of the network side for the first uplink data, to retransmit the first uplink data over the physical resource preconfigured by the network side.

Furthermore in a particular implementation, the initiative retransmitting module includes: a unit for obtaining the number of times that the data are transmitted is configured to obtain the number of times that the terminal retransmits the first uplink data; and a retransmitting unit is configured to stop the first uplink data from being retransmitted, when the number of times that the data are transmitted reaches the maximum number of times corresponding to the first uplink data.

Furthermore in a particular implementation, the first deciding module includes: a detecting unit is configured to detect a received feedback message of the network side for the first uplink data before a specific point of time, and to obtain a first detection result; and a deciding unit is configured to decide whether to retransmit the first uplink data on its own initiative, based upon the first detection result; where when the first detection result is YES, the deciding unit decides not to retransmit the first uplink data on its own initiative, and when the first detection result is NO, the deciding unit decides to retransmit the first uplink data on its own initiative.

Furthermore in a particular implementation, the specific point of time is a point of time corresponding to a preset length of time before the physical resource preconfigured by the network side is available after the first uplink data are transmitted.

Furthermore in a particular implementation, the preset length of time is a preset value, or the preset length of time is determined and notified by the network side to the terminal, or the preset length of time is determined and notified by the terminal to the network side.

Furthermore in a particular implementation, the detecting unit is configured: after the terminal transmits the first uplink data to the network side, to detect a received feedback message of the network side for the first uplink data before a specific point of time, by listening to the feedback message of the network side for the first uplink data, and to obtain the first detection result.

Furthermore in a particular implementation, the detecting unit is configured: to determine an instance of time when the network side transmits the feedback message for the first uplink data; and to detect whether the terminal receives the received feedback message of the network side for the first uplink data before a specific point of time based upon the instance of time when the feedback message is transmitted, and to obtain the first detection result; where when the terminal determines based upon the instance of time when the feedback message is transmitted, that the feedback message of the network side for the first uplink data can not be received before the specific point of time, to stop listening to the feedback message of the network side for the first uplink data.

Third Embodiment

Figure 8:
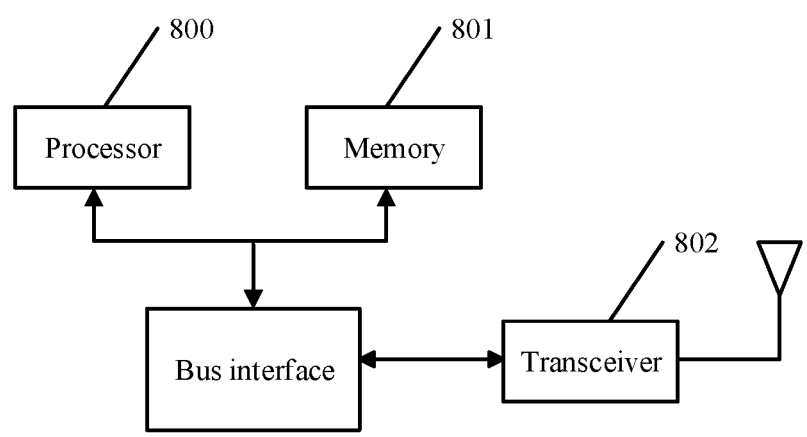
FIG. 8 is a schematic structural diagram of another terminal according to an embodiment of the application.

Referring to FIG. 8, a third embodiment of the application provides a terminal including: a processor 800, a memory 801, and a transceiver 802, where the processor 800 is responsible for managing a bus architecture and performing normal processes, and the memory 801 can store data for use by the processor 200 while performing operations. The transceiver 802 is configured to transmit and receive data under the control of the processor 800.

The bus architecture can include any number of interconnecting buses and bridges to link together various circuits including one or more processors represented by the processor 800, and one or more memories represented by the memory 801. The bus architecture can further link together various other circuits, e.g., a peripheral device, a manostat, a power management circuit, etc., all of which are well known in the art, so a further description thereof will be omitted in this context. The bus interface serves as an interface. The processor 800 is responsible for managing the bus architecture and performing normal processes, and the memory 801 can store data for use by the processor 200 while performing operations.

The flow according to the embodiment of the application can be applicable to the processor 800, or performed by the processor 800. In an implementation, the respective operations in the flow can be performed by integrated logic circuits in hardware, or instructions in software, in the processor 800. The processor 800 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the application can be implemented or performed. The general-purpose processor can be a micro processor, or can be any conventional processor, etc. The operations in the method according to the embodiment of the application can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 801, and the processor 800 reads the information in the memory 801, and performs the operations in the flow with the hardware thereof.

Particularly the processor 800 is configured to read and execute the program in the memory 801: to decide whether to retransmit first uplink data on its own initiative; and to retransmit the first uplink data over a physical resource preconfigured by the network side when the terminal decides to retransmit the first uplink data on its own initiative.

Particularly for example, the processor decides whether to retransmit the first uplink data on its own initiative, and retransmits the first uplink data over the physical resource preconfigured by the network side when the terminal decides to retransmit the first uplink data on its own initiative.

Furthermore in a particular implementation, the processor 800 is configured: to decide whether to retransmit the first uplink data on its own initiative, based upon a received notification message of the network side about whether to enable an initiative retransmission mechanism.

Furthermore in a particular implementation, the processor 800 is further configured: after the terminal transmits the first uplink data to the network side, and before the terminal obtains a feedback message of the network side for the first uplink data, to retransmit the first uplink data over the physical resource preconfigured by the network side.

Furthermore in a particular implementation, the processor 800 is configured: to obtain the number of times that the terminal retransmits the first uplink data; and to stop the first uplink data from being retransmitted, when the number of times that the data are transmitted reaches the maximum number of times corresponding to the first uplink data.

Furthermore in a particular implementation, the processor 800 is configured: to detect a received feedback message of the network side for the first uplink data before a specific point of time, and to obtain a first detection result; and to decide whether to retransmit the first uplink data on its own initiative, based upon the first detection result; where when the first detection result is YES, the processor decides not to retransmit the first uplink data on its own initiative, and when the first detection result is NO, the processor decides to retransmit the first uplink data on its own initiative.

Furthermore in a particular implementation, the specific point of time is a point of time corresponding to a preset length of time before the physical resource preconfigured by the network side is available after the first uplink data are transmitted.

Furthermore in a particular implementation, the preset length of time is a preset value, or the preset length of time is determined and notified by the network side to the terminal, or the preset length of time is determined and notified by the terminal to the network side.

Furthermore in a particular implementation, the processor 800 is configured: after the terminal transmits the first uplink data to the network side, to detect a received feedback message of the network side for the first uplink data before a specific point of time, by listening to the feedback message of the network side for the first uplink data, and to obtain the first detection result.

Furthermore in a particular implementation, the processor 800 is configured: to determine an instance of time when the network side transmits the feedback message for the first uplink data; and to detect whether the terminal receives the received feedback message of the network side for the first uplink data before a specific point of time based upon the instance of time when the feedback message is transmitted, and to obtain the first detection result; where when the terminal determines based upon the instance of time when the feedback message is transmitted, that the feedback message of the network side for the first uplink data can not be received before the specific point of time, to stop listening to the feedback message of the network side for the first uplink data.

An embodiment of the application provides a readable storage medium which is a nonvolatile storage medium including program codes configured, upon being executed on a computing device, to cause the computing device to perform the operations of the network-side device in the system above.

An embodiment of the application provides a readable storage medium which is a nonvolatile storage medium including program codes configured, upon being executed on a computing device, to cause the computing device to perform the operations of the terminal in the system above.

In the embodiments of the application, a terminal decides whether to retransmit first uplink data on its own initiative, and if so, then the terminal will retransmit the first uplink data on its own initiative over a physical resource preconfigured by the network side. With this technical solution, such a technical problem can be addressed that for an URLLC service, if the legacy HARQ mechanism is still applied to a retransmission mechanism, then there will be some interval of time between two adjacent transmission instances of uplink data so that retransmission may not be supported given a specific time-delay requirement and configuration, thus failing to provide the required reliability of the URLLC service. In this way, retransmission of the uplink data by the terminal on its own initiative can be supported to thereby shorten the interval of time between two adjacent transmission instances of the uplink data, improve a retransmission probability, increase the number of times that the data are retransmitted, and improve the reliability of data transmission.

Although the embodiments of the application have been described, those skilled in the art benefiting from the underlying inventive concept can make additional modifications and variations to these embodiments. Therefore the appended claims are intended to be construed as encompassing the embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A terminal, comprising:
a processor, a memory, and a transceiver, wherein:
the processor is configured to read and execute programs in the memory:
to decide whether to retransmit first uplink data on its own initiative; and to retransmit the first uplink data over a physical resource preconfigured by a network side when the terminal decides to retransmit the first uplink data on its own initiative;
wherein the processor is further configured to:
based on a configuration or an indicator of the network side, when predetermining that the terminal cannot receive a feedback message received from the network side for the first uplink data before a specific time point before a start moment at which the physical resource preconfigured by the network side is available, decide to retransmit the first uplink data on its own initiative, and retransmit the first uplink data over the physical resource preconfigured by the network side, wherein the specific time point is a point of time corresponding to a preset length of time before the start moment at which the physical resource preconfigured by the network side is available and after the first uplink data has been transmitted.

2. The terminal according to claim 1, wherein the processor is further configured:
to stop the first uplink data from being retransmitted, when the quantity of transmission times reaches the maximum quantity of transmission times corresponding to the first uplink data.

3. The terminal according to claim 1, wherein the preset length of time is a preset value, or the preset length of time is determined and notified by the network side to the terminal, or the preset length of time is determined and notified by the terminal to the network side.

4. A method for retransmitting uplink data, applicable to a terminal, the method comprising:
deciding, by the terminal, whether to retransmit first uplink data on its own initiative; and
retransmitting, by the terminal, the first uplink data over a physical resource preconfigured by a network side upon deciding to retransmit the first uplink data on its own initiative;
wherein the retransmitting, by the terminal, the first uplink data over the physical resource preconfigured by the network side upon deciding to retransmit the first uplink data on its own initiative comprises:
based on a configuration or an indicator of the network side, when predetermining, by the terminal, that the terminal cannot receive a feedback message received from the network side for the first uplink data before a specific time point before a start moment at which the physical resource preconfigured by the network side is available, deciding, by the terminal, to retransmit the first uplink data on its own initiative, and retransmitting, by the terminal, the first uplink data over the physical resource preconfigured by the network side, wherein the specific time point is a point of time corresponding to a preset length of time before the start moment at which the physical resource preconfigured by the network side is available and after the first uplink data has been transmitted.

5. The method according to claim 4, wherein the preset length of time is a preset value, or the preset length of time is determined and notified by the network side to the terminal, or the preset length of time is determined and notified by the terminal to the network side.

6. A non-transitory readable storage medium, comprising program codes configured, upon being executed on a computing device, to cause the computing device to perform the method according to claim 4.

* * * * *